US012192995B2

(12) United States Patent
Cao et al.

(10) Patent No.: US 12,192,995 B2
(45) Date of Patent: Jan. 7, 2025

(54) JOINT SCHEDULING OF SIDELINK AND UU LINK

(71) Applicant: QUALCOMM Incorporated, San Diego, CA (US)

(72) Inventors: Yiqing Cao, Beijing (CN); Juan Zhang, Beijing (CN); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/761,447

(22) PCT Filed: Oct. 7, 2020

(86) PCT No.: PCT/CN2020/119835
§ 371 (c)(1),
(2) Date: Mar. 17, 2022

(87) PCT Pub. No.: WO2021/068859
PCT Pub. Date: Apr. 15, 2021

(65) Prior Publication Data
US 2023/0164772 A1   May 25, 2023

(30) Foreign Application Priority Data
Oct. 11, 2019   (WO) ................ PCT/CN2019/110555

(51) Int. Cl.
*H04W 72/12* (2023.01)
*H04W 72/1268* (2023.01)
(Continued)

(52) U.S. Cl.
CPC ..... *H04W 72/1268* (2013.01); *H04W 72/231* (2023.01); *H04W 72/232* (2023.01)

(58) Field of Classification Search
CPC . H04W 72/25; H04W 72/40; H04W 28/0867; H04W 72/1268; H04W 72/231; H04W 72/232
See application file for complete search history.

(56) References Cited

U.S. PATENT DOCUMENTS

| 2016/0044707 A1* | 2/2016 | Folke ................ H04W 72/1268 |
| | | 370/329 |
| 2016/0183241 A1* | 6/2016 | Lee .................. H04W 56/0015 |
| | | 455/425 |

(Continued)

FOREIGN PATENT DOCUMENTS

| CN | 107534891 A | 1/2018 |
| CN | 107645774 A | 1/2018 |

(Continued)

OTHER PUBLICATIONS

Supplementary European Search Report—EP20874906—Search Authority—The Hague—Aug. 30, 2023.

(Continued)

*Primary Examiner* — Shukri Taha
(74) *Attorney, Agent, or Firm* — Arent Fox, LLP

(57) ABSTRACT

A first user equipment (UE) is configured to communicate with a base station over a Uu link and communicate with a second UE over a sidelink. The first UE transmits a joint scheduling request and a joint buffer status report (BSR) for an uplink transmission on the Uu link with the base station and a sidelink transmission on the sidelink with the second UE. The joint BSR is associated with a relative latency of the uplink transmission and the sidelink transmission. The first UE receives from the base station, a joint transmission grant scheduling the uplink transmission on a first set of resources and scheduling the sidelink transmission on a second set of resources. The first UE transmits a first transmission on the (Continued)

first set of resources for the uplink transmission and a second transmission on the second set of resources for the sidelink transmission.

26 Claims, 9 Drawing Sheets

(51) Int. Cl.
*H04W 72/231* (2023.01)
*H04W 72/232* (2023.01)

(56) References Cited

U.S. PATENT DOCUMENTS

| | | | |
|---|---|---|---|
| 2018/0324838 A1 | 11/2018 | Folke et al. | |
| 2022/0174774 A1* | 6/2022 | Tseng | H04W 76/23 |
| 2022/0209927 A1 | 6/2022 | Shreevastav et al. | |

FOREIGN PATENT DOCUMENTS

| | | |
|---|---|---|
| CN | 109983814 A | 7/2019 |
| WO | 2016108548 A1 | 7/2016 |
| WO | 2017134578 A1 | 8/2017 |
| WO | 2018124776 A1 | 7/2018 |
| WO | 2018202798 A1 | 11/2018 |
| WO | 2018232259 A1 | 12/2018 |

OTHER PUBLICATIONS

Ericsson: "Feature Lead Summary #4 on Resource Allocation for NR Sidelink Mode 1," 3GPP TSG-RAN WG1 Meeting #97, R1-1907916, May 13-17, 2019 (May 20, 2019) the whole document, 24 pages.

International Search Report and Written Opinion—PCT/CN2019/110555—ISA/EPO—Jul. 10, 2020.

International Search Report and Written Opinion—PCT/CN2020/119835—ISA/EPO—Jan. 13, 2021.

Mediatek Inc: "On NR SL Mode-1 Resource Allocation," R1-1904493, 3GPP TSG RAN1 WG1 Meeting #96bis, Apr. 8-12, 2019, the whole document, 5 pages.

VIVO: "Discussion on Mode 1 Resource Allocation Mechanism", 3GPP Draft, 3GPP TSG RAN WG1 #97, R1-1906138, Reno, USA, May 13-17, 2019, May 17, 2019 (May 17, 2019), 13 Pages, p. 3, Part 2.3, the whole document.

VIVO: "Enhancements of Uu Link to Control Sidelink", 3GPP Draft, 3GPP TSG RAN WG1 Meeting #95, R1-1812310, Enhancements of Uu Link to Control Sidelink, 3rd Generation Partnership Project (3GPP), Mobile Competence Centre, 650, Route Des Lucioles, F-06921, Sophia-Antipolis Cedex, France, vol. Ran WG1, No. Spokane, USA,. 20181112-20181116, Nov. 3, 2018 (Nov. 3, 2018), XP051478499, 5 pages, Section 2, Section 4, figures 1. 2, 3.

* cited by examiner

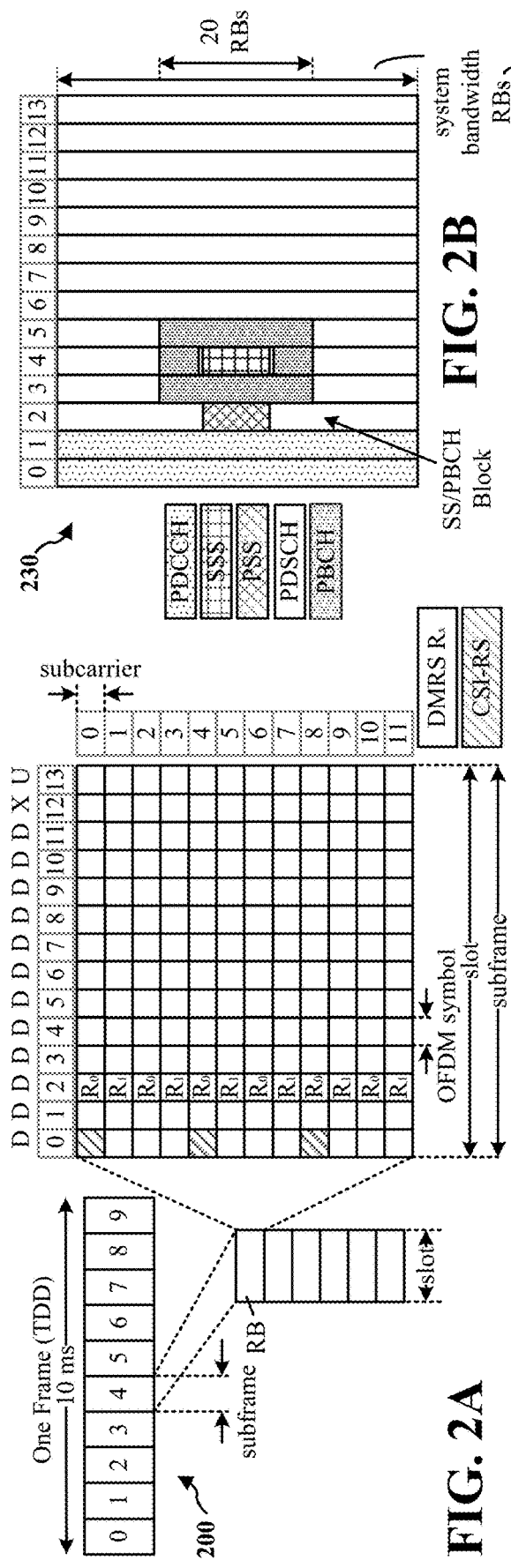
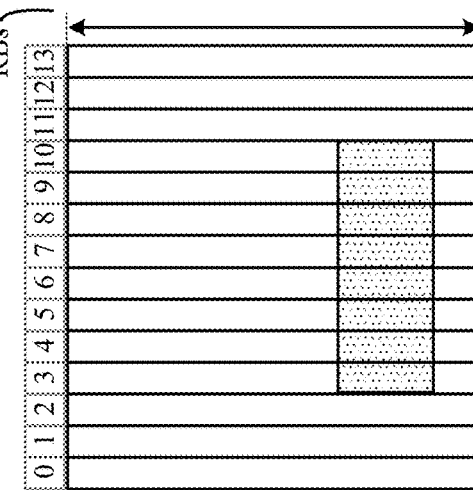
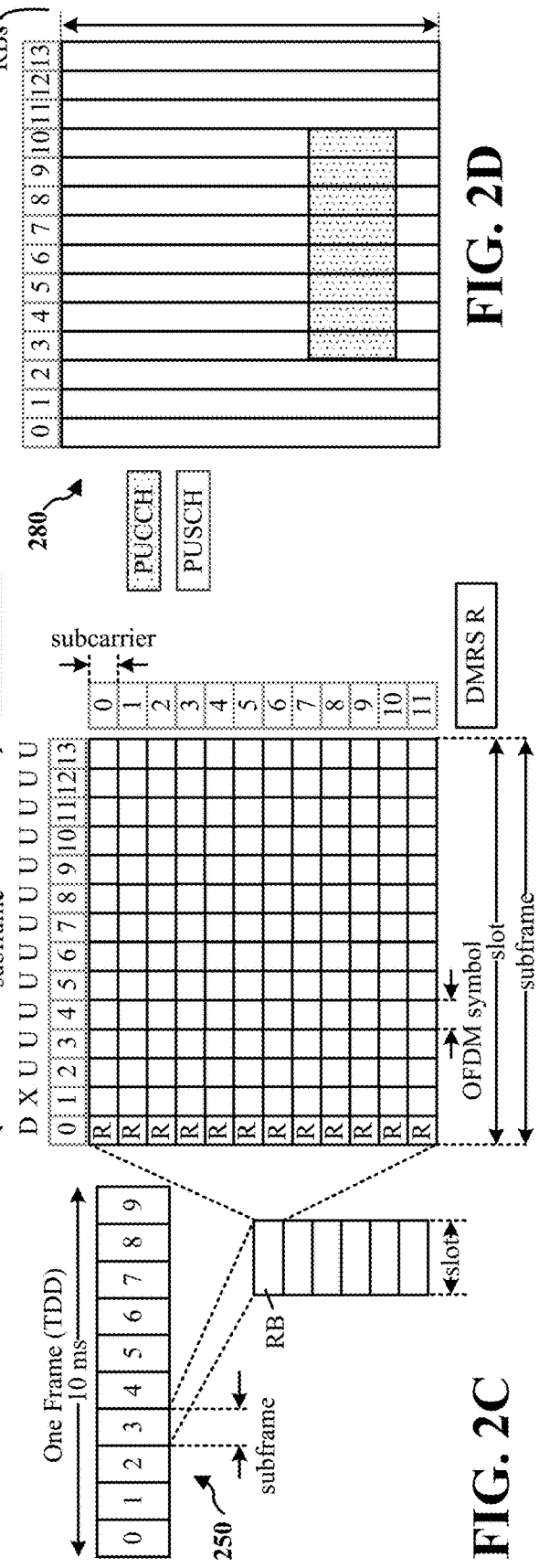
FIG. 2A
FIG. 2B
FIG. 2C
FIG. 2D

JOINT SCHEDULING OF SIDELINK AND UU LINK

CROSS-REFERENCE TO RELATED APPLICATIONS

This application is a 35 U.S.C. § 371 National Phase Application of PCT Application No. PCT/CN2020/119835 filed Oct. 7, 2020, entitled "JOINT SCHEDULING OF SIDELINK AND UU LINK", which claims priority to International Patent Application No. PCT/CN2019/110555 titled "JOINT SCHEDULING OF SIDELINK AND UU LINK," filed Oct. 11, 2019, which is assigned to the assignee hereof. The disclosures of these prior applications are hereby incorporated by reference herein in their entirety.

BACKGROUND

Technical Field

The present disclosure relates generally to communication systems, and more particularly, joint scheduling of sidelink and Uu link transmissions.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus are provided. The method may include transmitting, from a user equipment (UE), a joint scheduling request and a joint buffer status report (BSR) for an uplink transmission on a Uu link with a base station and a sidelink transmission on a sidelink with another UE, wherein the joint BSR is associated with a relative latency of the uplink transmission and the sidelink transmission. The method may include receiving, from the base station, a joint transmission grant scheduling the uplink transmission on a first set of resources and scheduling the sidelink transmission on a second set of resources. The method may include transmitting, from the UE, a first transmission on the first set of resources for the uplink transmission and a second transmission on the second set of resources for the sidelink transmission.

In another aspect, a method, a non-transitory computer-readable medium, and an apparatus for a base station are provided. The method may include receiving, at a base station from a UE, a joint scheduling request and a joint BSR for an uplink transmission on a Uu link with the UE and a sidelink transmission on a sidelink between the UE and another UE, wherein the joint scheduling request is associated with a relative latency of the uplink transmission and the sidelink transmission. The method may include scheduling the uplink transmission and the sidelink transmission on a common set of resources based on the relative latency of the uplink transmission and the sidelink transmission. The method may include transmitting, from the base station, a joint transmission grant indicating a first set of resources for the uplink transmission and a second set of resources for the sidelink transmission. The method may include receiving, from the UE, a first transmission on the first set of resources for the uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of DL channels within a subframe, in accordance with certain aspects of the present description.

FIG. 2C is a diagram illustrating an example of a second frame, in accordance with certain aspects of the present description.

FIG. 2D is a diagram illustrating an example of UL channels within a subframe, in accordance with certain aspects of the present description.

DETAILED DESCRIPTION

Figure 1:
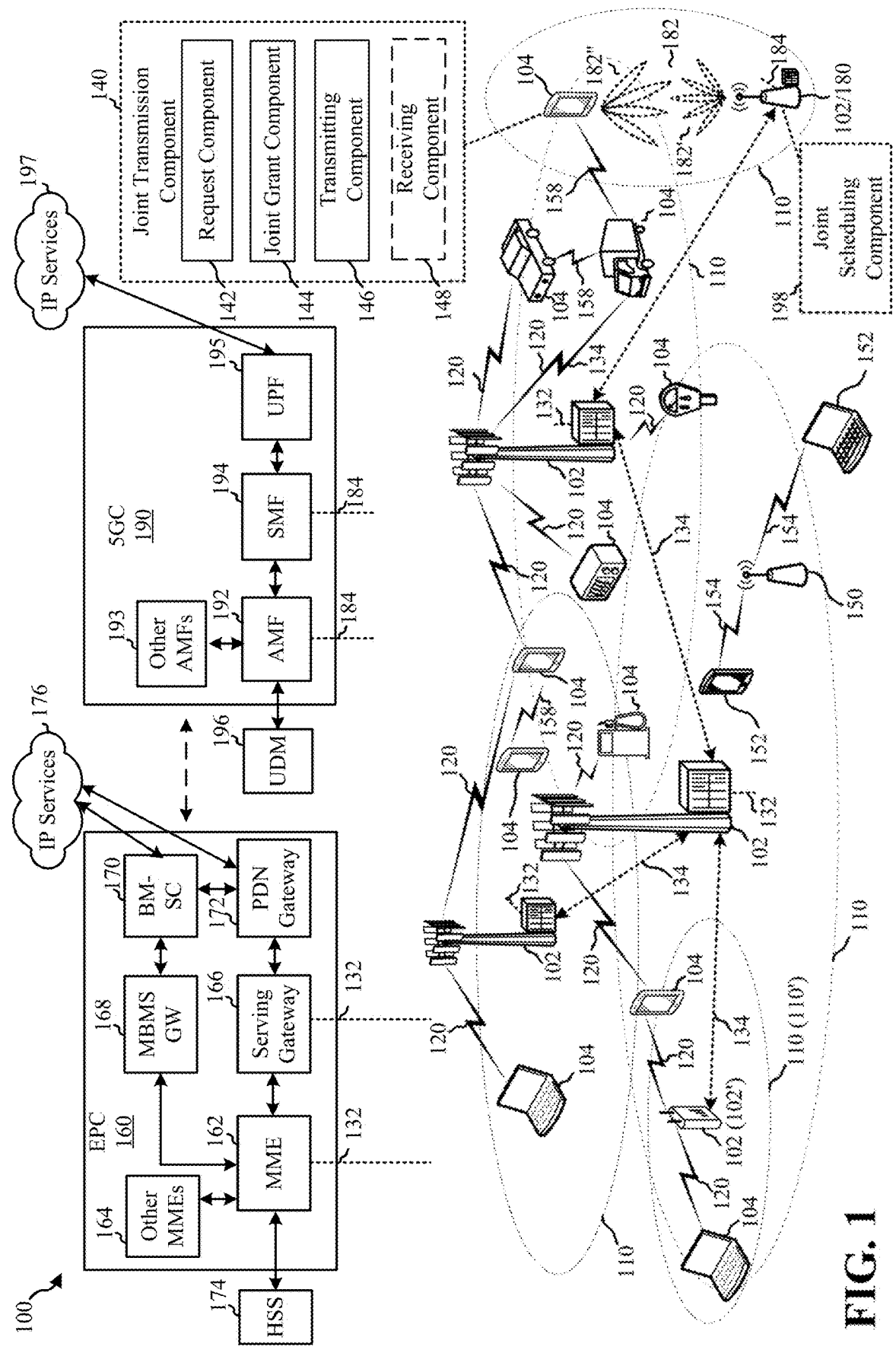
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5GNR, the concepts described herein may be applicable to other similar areas, such as LTE, LTE-A, CDMA, GSM, and other wireless technologies.

A sidelink communication may refer to a wireless transmission from one user equipment (UE) to another UE. A sidelink may refer to the communication link between the UEs. In 5GNR, sidelink communications may share time and frequency domain resources with communications with a Uu link. The Uu link may refer to the communication link between a UE and a base station. A base station (e.g., a gNB) may provide a grant for sidelink communications. A dynamic grant may provide resources for one or multiple sidelink transmissions of a single transport block (TB) based on a media access control (MAC) protocol data unit (PDU). A UE may request a dynamic grant by transmitting a scheduling request (SR) or buffer status report (BSR) to the base station for the purpose of requesting resources. A configured grant (CG) may provide a set of resources in a periodic manner for multiple sidelink transmissions. A CG may be a type-1 grant where all parameters are configured via radio resource control (RRC) messaging and ready to use after configuration with no layer 1 (L1) involvement. Alternatively, a CG may be a type-2 grant where some parameters are indicated via downlink control information (DCI) activation and the rest of the parameters are configured RRC via RRC messages.

Wireless communications involving a vehicle (e.g., vehicle to anything (V2X) may include at least the following two sidelink (SL) resource allocation modes. In mode 1, the base station schedules sidelink resources to be used by the UE for sidelink transmissions. For example, a dynamic grant by the base station may provide resources for transmission of a physical sidelink control channel (PSCCH) and a physical sidelink shared channel (PSSCH). In mode 2, the UE determines (i.e., base station does not schedule) sidelink transmission resources within sidelink resources configured by the BS or the network, or from pre-configured SL resources. For instance, in mode 2, sidelink resource allocation may include: a) UE autonomously selects SL resource for transmission; b) UE assists SL resource selection for other UE(s); c) UE is configured with NR configured grant (Type-1 like) for SL transmission; and d) UE schedules SL transmissions of other UEs.

Some use cases for sidelink communications may be associated with related communications on the Uu link between the UE and a base station. For example, in an interactive gaming scenario, users may be located in close proximity (e.g., the same room or building) and may communicate game information with each other. The users may also communicate with a server that is remotely located. The communications between users may be carried over the sidelink, and the communications with the server may be carried over the Uu link. For instance the Uu link may be used to carry a game map, background traffic updates, user profiles, score updates, etc. The sidelink may be used to carry interactive messages (e.g., communications between players, position updates, or interaction commands). In an aspect, the communications on the Uu link may have different latency goals than communications on the sidelink. For example, in a vehicular environment, it may be beneficial for a UE located in a vehicle to have a lower latency for vehicle to vehicle (V2V) communications warning of a braking situation than to provide the same information to a navigation service. As another example, in a virtual reality (VR) or augmented reality (AR) gaming environment, position and movement information for the other players may have a low latency requirement to provide a smooth movement of rendered graphics. In contrast, a map of the virtual world received from the server may change slowly, so a higher latency may be tolerated.

As another example, the order of communications may be important. For instance, a UE may require information from the server before an interaction with another player is allowed. Accordingly, it may be important for the downlink packet from the server to arrive before sidelink information from the other player.

The present disclosure provides mechanisms for jointly scheduling transmissions on the Uu link and the sidelink. When a UE has data to transmit on the uplink and the sidelink, the UE may transmit a joint scheduling request to the base station. The joint scheduling request may indicate the buffer status for the uplink and the sideline and indicate a relative latency between the uplink and the sidelink transmissions. A base station (e.g., the serving gNB) may receive the joint scheduling request and schedule an uplink transmission and a sidelink transmission based on the buffer status and relative latency. The base station may transmit a joint grant indicating different resources for the uplink transmission and the sidelink transmission. The UE may transmit the uplink transmission and the sidelink transmission using the respective resources. The base station may also jointly schedule downlink transmissions and sidelink receptions for the UE.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a joint transmission component 140 that requests joint transmissions and receives grants for joint transmissions. The joint transmission component 140 may include: a request component 142 that transmits a joint SR and/or a joint BSR to request resources for the joint transmission; a joint grant component 144 that receives a joint transmission grant indicating resources for an uplink transmission and a sidelink transmission, or a joint reception grant indicating resources for a downlink transmission and a sidelink reception; a transmitting component 146 that transmits the uplink transmission and the sidelink transmission; and an optional receiving component 148 that receives the downlink transmission and the sidelink reception.

Figure 9:
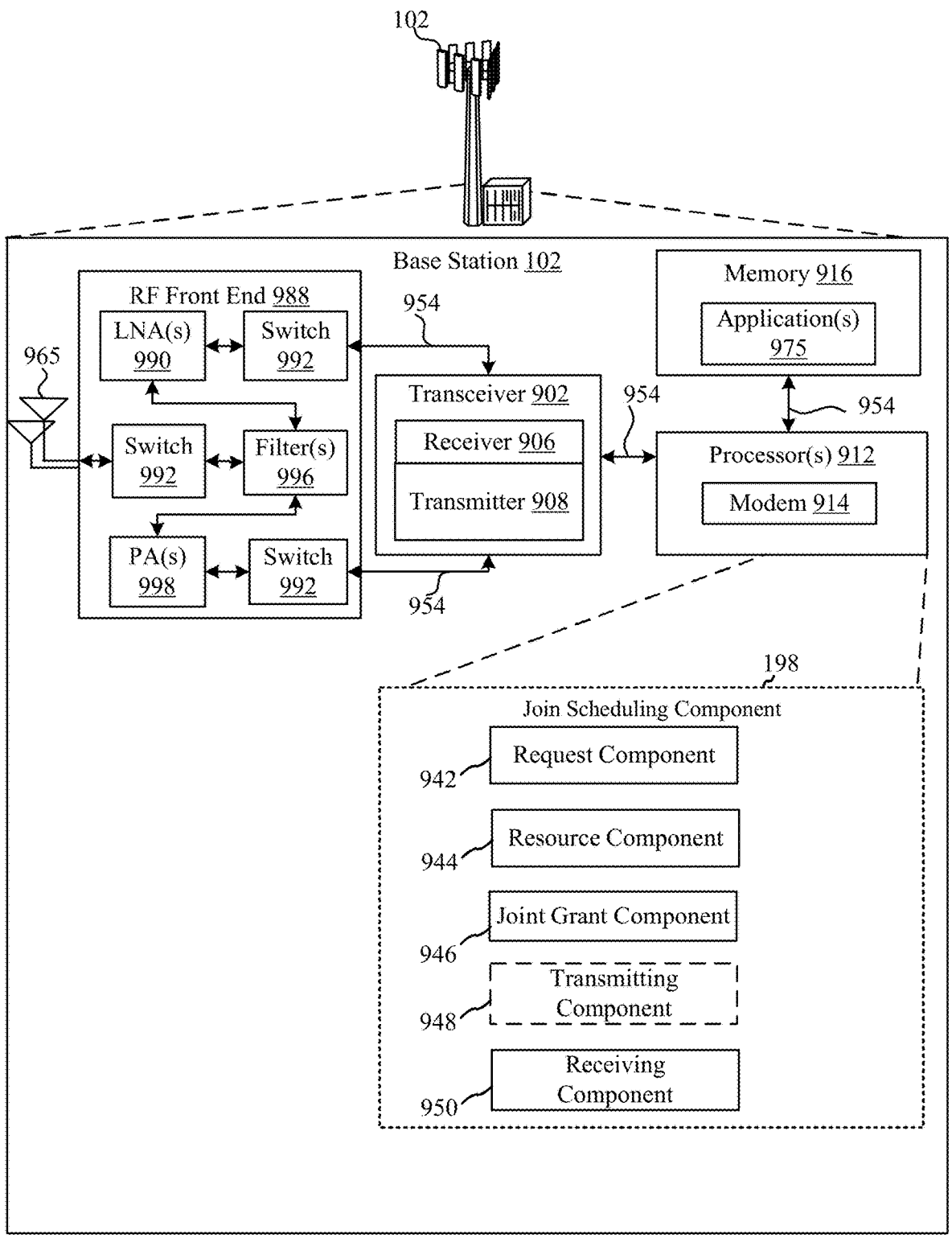
FIG. 9 is a schematic diagram of example components of the base station of FIG. 1, in accordance with certain aspects of the present description.

In an aspect, one or more of the base stations 102 may include a joint scheduling component 198 that performs the actions of the base station as described herein (e.g., scheduling the joint transmissions for one or more UEs). For example, as illustrated in FIG. 9, the joint scheduling component 198 may include: a request component 942 that receives the joint SR and/or joint BSR requesting resources for a joint transmission; a resource component 944 that schedules the uplink transmission and sidelink transmission from a set of common resources; a joint grant component 946 that transmits the joint transmission grant or the joint reception grant; an optional transmitting component 948 that transmits the downlink transmission; and a receiving component 950 that receives the uplink transmission.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for uplink, downlink, and sidelink transmissions to a UE 104 including a joint transmission component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu=0$ to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
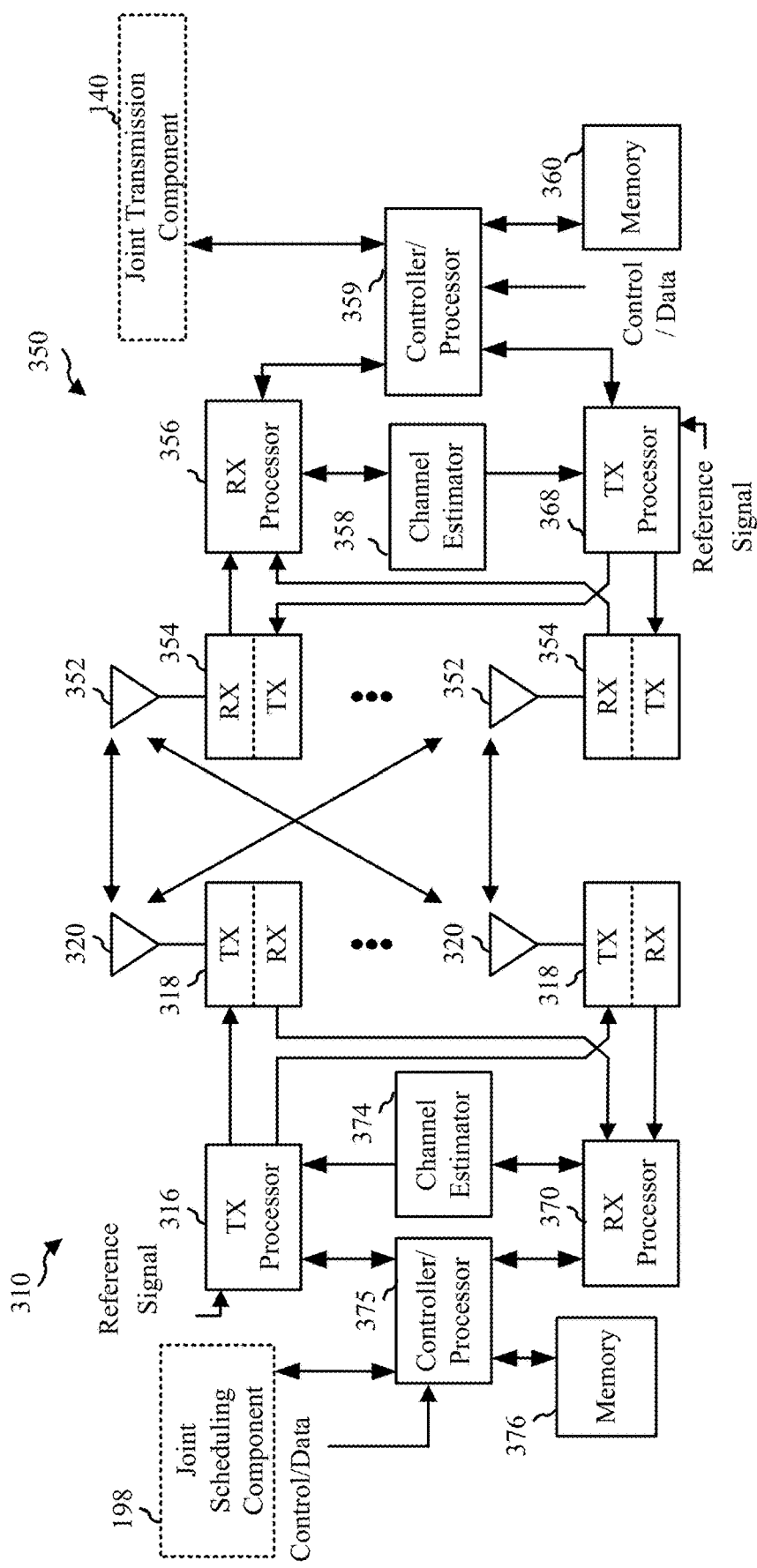
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

As described in further detail below, the UE 350 may communicate with another UE 350 instead of the base station 310 using sidelink communications.

At least one of the TX processor 368, the RX processor 356, and the controller/processor 359 may be configured to perform aspects in connection with the joint transmission component 140 of FIG. 1.

At least one of the TX processor 316, the RX processor 370, and the controller/processor 375 may be configured to perform aspects in connection with the joint scheduling component 198 of FIG. 1.

Figure 4:
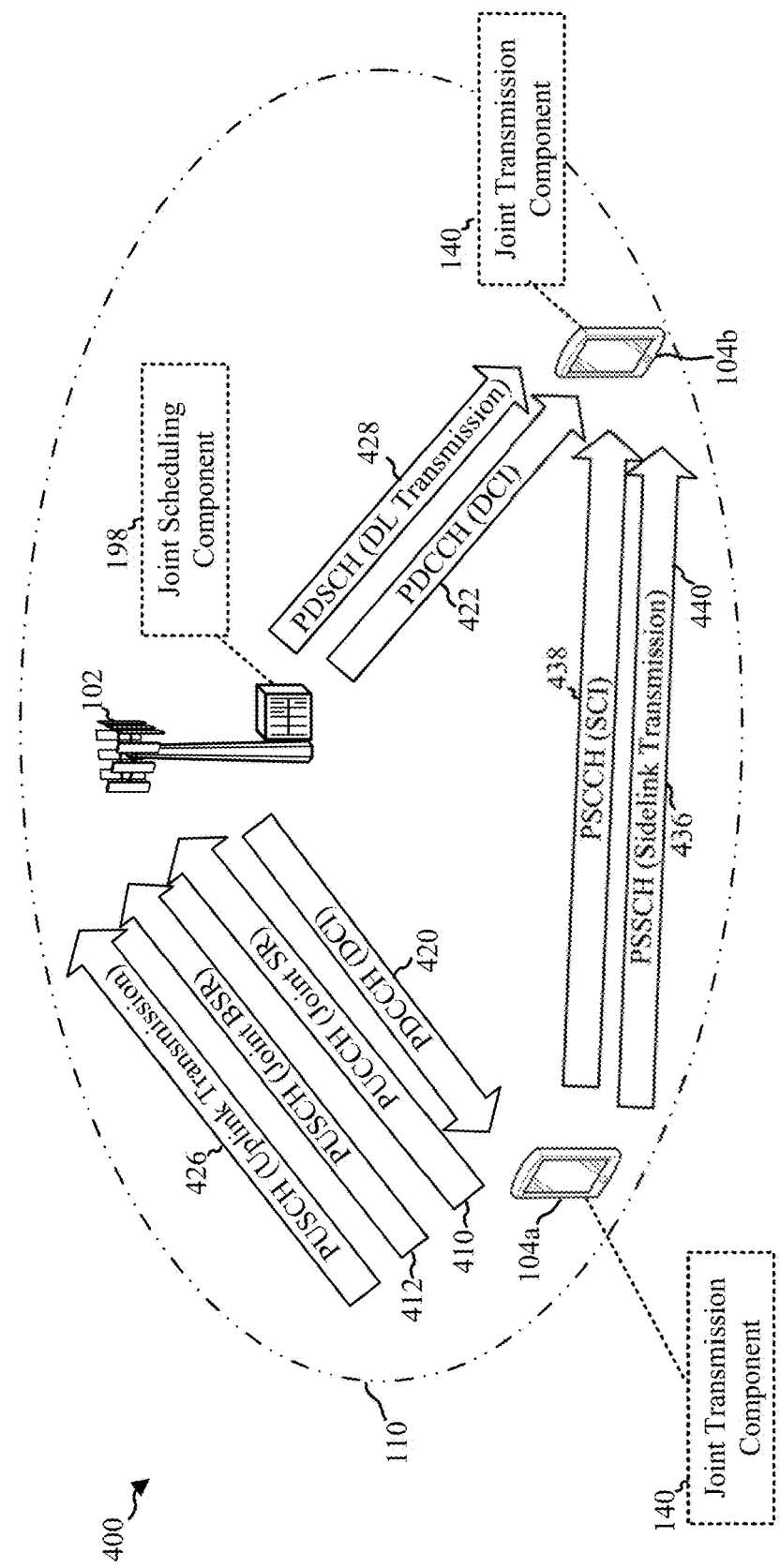
FIG. 4 is a schematic diagram illustrating an example configuration for a serving cell and UEs communicating via a sidelink channel, in accordance with certain aspects of the present description.

Turning to FIG. 4, an example scenario 400 for joint communications includes a Uu link between a UE 104a and a base station 102 and on a sidelink between UE 104a and UE 104b. Each of the UEs 104a and 104b may be an example of the UE 104 and may include a joint transmission component 140. The UEs 104a and 104b may be within the coverage area 110 of the base station 102, while others of the UEs 104a and 104b may be outside of the coverage area 110 of the base station 102. For example, the UE 104a may be within the coverage area 110 of the base station 102 and the UE 104b may be outside of the coverage area 110 of the base station 102.

Sidelink communications may occur among the UEs 104a and 104b. As discussed above, mode 1 communications may be scheduled by a base station (e.g., base station 102). In joint scheduling, the base station 102 may schedule both an uplink transmission 426 on a PUSCH from a UE 104a and a sidelink transmission 436 on a physical sidelink shared channel (PSSCH) from the UE 104a. The base station 102 may also schedule the sidelink reception 440, which may refer to the sidelink transmission 436 from the perspective of the UE 104b.

In an aspect, the UE 104a may initiate the joint scheduling by transmitting a joint scheduling request (SR). A joint scheduling request may refer to an indication from the UE that the UE has data to transmit on both the Uu link and the sidelink. For example, the UE 104a may transmit the joint SR 410 on a PUCCH. The joint SR 410 may indicate that the UE 104a has data to transmit on both the Uu link and the sidelink. Generally, the joint SR may utilize SR reporting resources for uplink transmissions. That is, the joint SR may be configured with a periodicity and offset defining PUCCH resources. In an aspect, to distinguish a joint SR from a normal SR, the joint SR 410 may have a longer symbol duration or higher energy than a normal SR. Alternatively, the joint SR 410 may have the same format as a normal SR.

The UE 104a may follow the joint SR 410 with a joint buffer status report (BSR) 412. The joint BSR may refer to an indication of a buffer size level for each of the Uu link and the sidelink. The joint BSR 412 may be transmitted on the PUSCH as a media access control (MAC) control entity (CE). Generally, the joint BSR 412 includes information for scheduling transmissions from the UE 104a. For example, the joint BSR 412 may include a buffer size level for an uplink transmission 426 on the Uu link and a buffer size level for a sidelink transmission 436. The joint BSR 412 may also be associated with a relative latency of the uplink transmission 426 and the sidelink transmission 436. The relative latency may indicate an amount of time between the uplink transmission and the sidelink transmission. For example, the relative latency may be a preferred latency, permissible latency, or latency requirement of a higher layer application. The joint BSR 412 may also indicate an order of the uplink transmission and the sidelink transmission.

In an aspect, the available size for a MAC-CE may depend on an uplink grant and a scheduled transmission. The joint BSR 412 may be a long BSR that includes a buffer size level for multiple logical channel groups (LCGs). For example, a long BSR may include the buffer size level for the uplink transmission 426 on the Uu link and the buffer size level for a sidelink transmission 436. For instance, the buffer size level for the uplink transmission 426 and the buffer size level for the sidelink transmission 436 may each be associated with a logical channel group identifier (LCG ID). The relative latency between the uplink transmission 426 and the sidelink transmission 436 may be included as a field within the long BSR. Similarly, the transmission order may be included as a field within the long BSR. The joint BSR 412 may also be transmitted as two separate BSRs in one MAC protocol data unit (PDU), or in consecutive MAC PDUs, for example, using short BSRs. For example, each short BSR may include the LCG ID and the buffer size level for one of the uplink transmission 426 or the sidelink transmission 436. The transmission order may be indicated implicitly by the order of the short BSRs. For example, the UE 104a may implicitly request the uplink transmission 426 and the sidelink transmission 436 to be in the same order as the LCG IDs in the short BSRs. The relative latency requirement may be included in either short BSR or another part of the MAC PDU.

The joint scheduling component 198 at the base station 102 may schedule the uplink transmission and the sidelink transmission based on the buffer size levels, relative latency, and transmission order. The joint scheduling component 198 may determine a first set of resources for the uplink transmission 426 and a second set of resources for the sidelink transmission 436. As discussed in further detail below, the joint scheduling component 198 may also account for transmission gaps in the joint scheduling to mitigate interference. The joint scheduling component 198 may transmit a joint grant 420 on a PDCCH to schedule both the uplink transmission 426 and the sidelink transmission 436. The joint grant 420 may be referred to as a joint transmission grant. The joint grant 420 may be transmitted as one or more DCIs. In an aspect, a new DCI format may be defined for the joint grant 420 that includes both the first set of resources for the uplink transmission 426 and the second set of resources for the sidelink transmission 436. In another aspect, the joint grant 420 may be transmitted as separate DCIs. For example, the joint scheduling component 198 may transmit two DCIs in the same slot using two different radio network temporary identifiers (RNTIs) for the UE 104a. Alternatively, the joint scheduling component 198 may transmit the two DCIs in consecutive slots using the same RNTI.

The joint scheduling component 198 may also transmit a grant 422 to the UE 104b for receiving the sidelink transmission (e.g., when operating in sidelink mode 1). The grant 422 may be a DCI carried on the PDCCH. As discussed in further detail below, the grant 422 may be a joint grant combining the sidelink transmission with a downlink transmission. The grant 422 may be referred to as a joint reception grant. Alternatively, (e.g., if the UE 104b is not in the coverage area of the base station 102 or sidelink mode 2 is used), the UE 104a may transmit a sidelink grant 438 on a physical sidelink control channel (PSCCH) as sidelink control information (SCI) based on the sidelink portion of the joint grant 420.

Joint scheduling may also be used for a UE receiving a downlink transmission and a sidelink transmission. For example, the joint scheduling component 198 may receive data for a downlink transmission along with an upper layer indicator indicating that the UE 104 (e.g., UE 104b) receiving the downlink transmission 428 on a PDSCH should also receive a sidelink reception 440 associated with the downlink transmission on the PSSCH. For example, the upper layer indicator may be an RRC configuration of a particular radio bearer. For example, the RRC configuration may indicate that all downlink traffic for the radio bearer is associated with sidelink transmissions. The RRC configuration may also indicate the relative latency and transmission order for the downlink transmission and the sidelink transmission. Accordingly, the joint scheduling component 198 may schedule the UE 104b to receive both the downlink transmission on a third set of resources and the sidelink transmission from another UE (e.g., UE 104a) on a fourth set or resources using a joint grant 422. The scheduling component 198 may take into account a discontinuous reception (DRX) configuration of the UE 104b. For example, the UE 104b may have a separate DRX configuration for sidelink and the Uu link. The scheduling component 198 may consider the transmission order and relative latency when scheduling the downlink transmission and sidelink transmission according to the relevant DRX configurations.

A joint grant 422 for receiving a downlink transmission and a sidelink transmission may be similar to the joint grant 420. That is, the joint grant 422 may be transmitted as one or more DCI. In an aspect, a new DCI format may be defined for the joint grant 422 that includes both the third set of resources and the fourth set of resources. In another aspect, the joint grant 420 may be transmitted as separate DCIs. For example, the joint scheduling component 198 may transmit two DCIs in the same slot using two different radio network temporary RNTIs for the UE 104b. Alternatively, the joint scheduling component 198 may transmit the two DCIs in consecutive slots using the same RNTI.

In an aspect, the joint scheduling component 198 may jointly schedule transmissions to mitigate interference between transmissions on the Uu link and on the sidelink. In an aspect, the transmissions on the Uu link and the transmissions on the sidelink may utilize different numerologies. That is, the transmissions on the Uu link may have a different sub-carrier spacing than transmissions on the sidelink.

Figure 5:
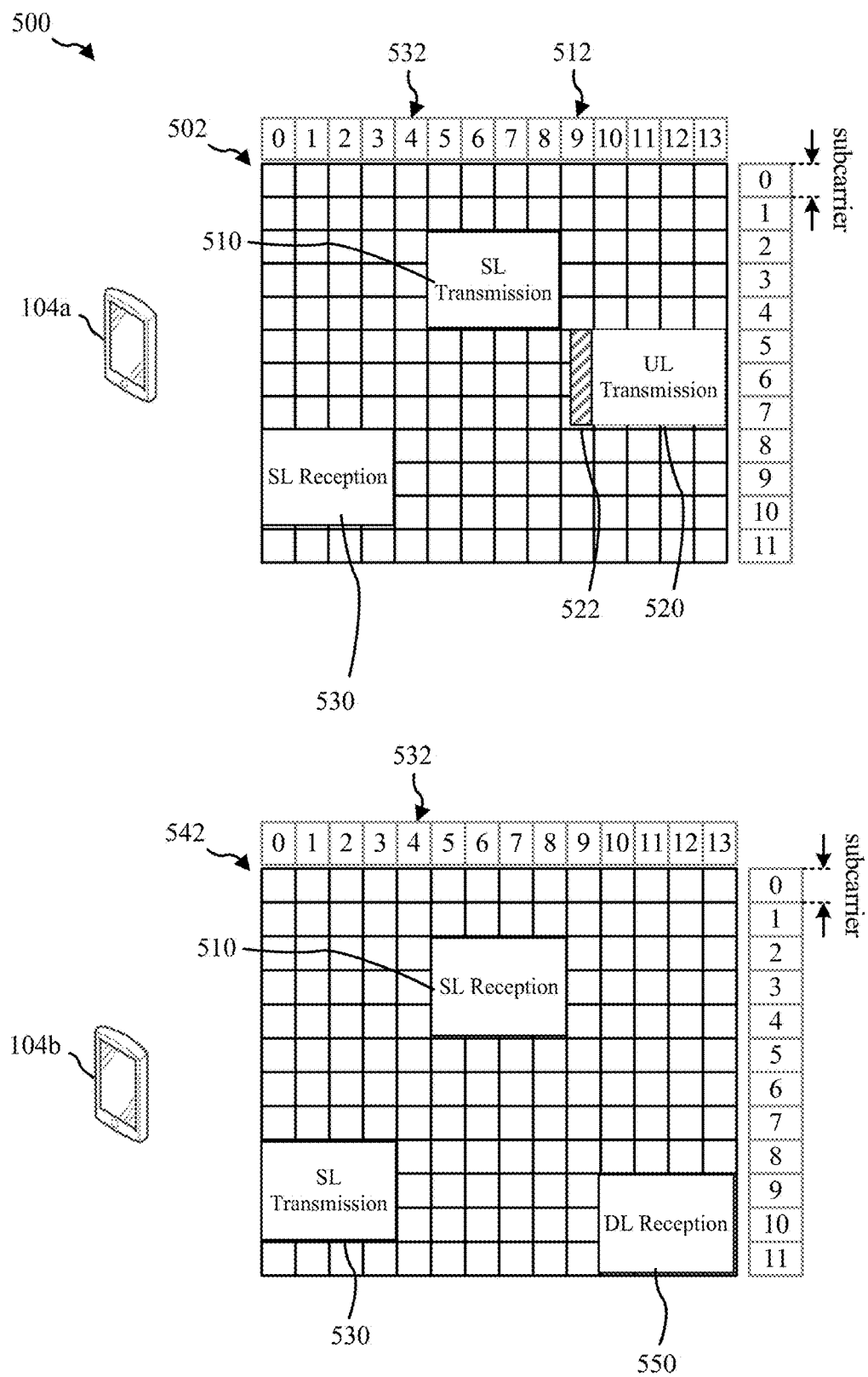
FIG. 5 is a resource diagram illustrating example gaps between Uu and sidelink transmissions, in accordance with certain aspects of the present description.

Turning to FIG. 5, a resource diagram 500 includes timing gaps related to joint transmission scheduling. The joint scheduling component 198 may schedule joint transmissions from a set of common resources 502. The joint scheduling component 198 of the base station 102 may create the transmission gaps by selectively scheduling Uu and sidelink transmissions. For instance, the joint scheduling component 198 may utilize rules that build the timing gaps into any scheduled transmissions. For a UE 104 (e.g., UE 104a) transmitting an uplink transmission 426 and a sidelink transmission 436, a transmission gap 512 may separate a first set of resources 520 for the uplink transmission 426 from a second set of resources 510 for the sidelink transmission 436. The uplink transmission 426 and the sidelink transmission 436 may have different timing advances (TA). An uplink TA 522 may be configured based on propagation delays to the base station 102, while no TA may be configured for the sidelink transmission 436 assuming close proximity of the UEs 104. When the first set of resources 520 for the uplink transmission 426 is after the second set of resources 510 for the sidelink transmission 436, a gap 512 of, for example, one symbol or a half symbol may prevent the uplink transmission 426 (including TA 522) from overlapping the second set of resources 510 for the sidelink transmission 436. Additionally, when different numerologies are used, the transmission gap 512 may allow the UE 104a to perform RF tuning between the transmissions.

For a UE 104 (e.g., UE 104b) receiving a sidelink transmission (e.g., sidelink reception 440), the joint scheduling component 198 may schedule a third set of resources 550 for a downlink reception and a fourth set of resources 530 for a sidelink transmission from a set of common resources 542. A gap 532 may separate the transmission directions. For example, the gap 532 may be between the fourth set of resources 530 for the sidelink transmission and either the third set of resources 550 for a downlink reception (e.g., PDSCH 428) or the second set of resources 510 for the sidelink reception 440. The gap 532 may be, for example, one symbol or a half symbol located at the end of the sidelink transmission.

Figure 6:
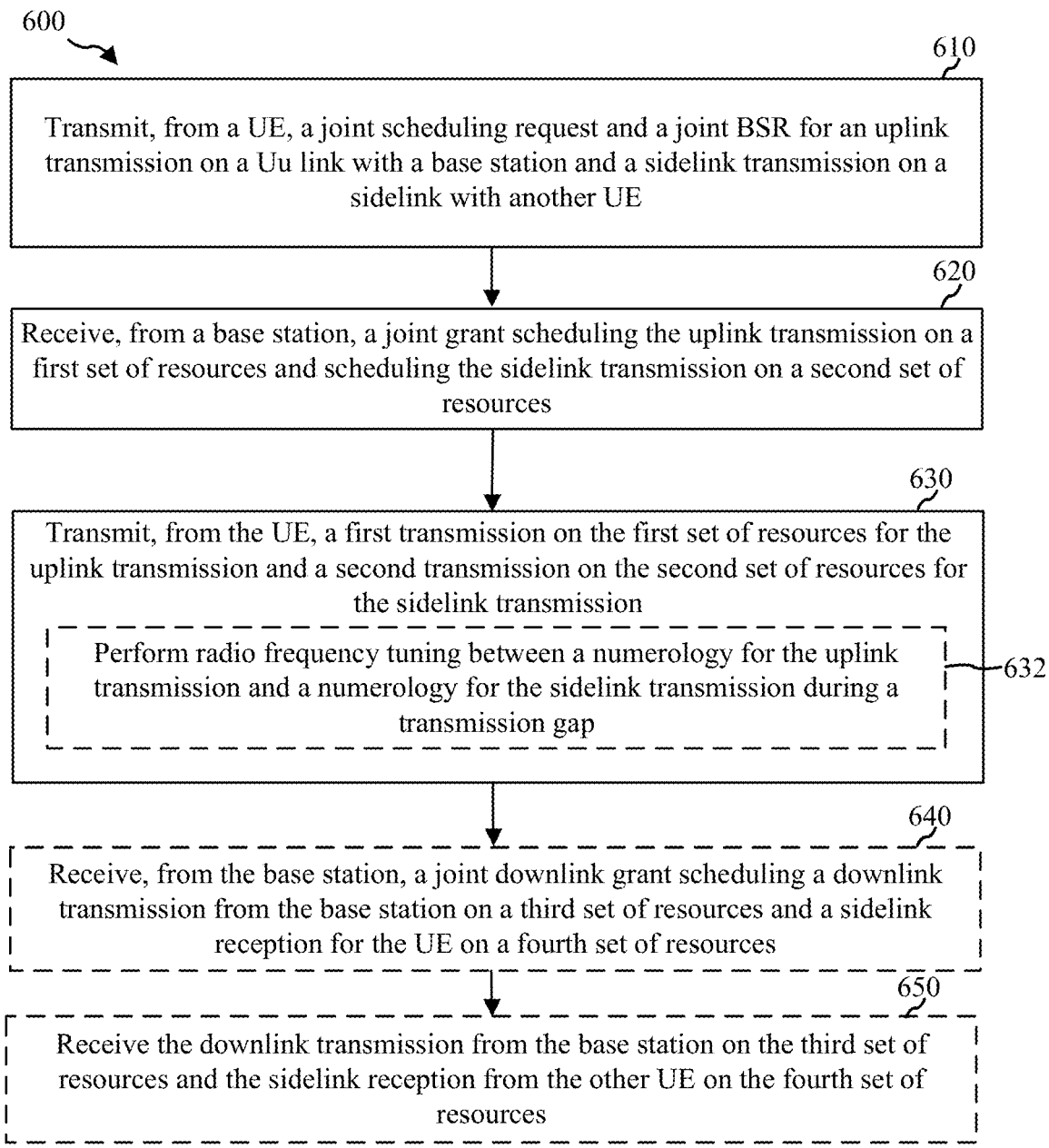
FIG. 6 is a flowchart of an example method of joint scheduling transmissions on the Uu link and the sidelink for a UE, in accordance with certain aspects of the present description.

FIG. 6 is a flowchart of a method 600 of wireless communication that may be performed by a UE (e.g., the UE 104, which may include the memory 360 and which may be the entire UE 104 or a component of the UE 104 such as the joint transmission component 140, the TX processor 368, the RX processor 356, and/or the controller/processor 359) for performing a joint transmission on a Uu link and a sidelink. The method 600 may be performed in communication with a base station 102 including the joint scheduling component 198.

At block 610, the method 600 may include transmitting, from a UE, a joint scheduling request and a joint BSR for an uplink transmission on a Uu link with a base station and a sidelink transmission on a sidelink with another UE. The joint BSR may be associated with a relative latency of the uplink transmission and the sidelink transmission. In an aspect, for example, the UE 104, the TX processor 368, and/or the controller/processor 359 may execute the joint transmission component 140 and/or the request component 142 to transmit, from a UE 104a, a joint scheduling request 410 and a joint BSR 412 for an uplink transmission 426 on a Uu link with a base station 102 and a sidelink transmission on a sidelink with another UE 104b. The joint scheduling request 410 may have a longer symbol duration or higher energy than a scheduling request for a single transmission. The joint BSR 412 may indicate a first buffer size level for a Uu uplink buffer and a second buffer size level for a sidelink buffer, the relative latency, and a transmission order of the uplink transmission and the sidelink transmission. In an implementation, the joint BSR 412 includes the first buffer size level and the second buffer size level in a single MAC CE (e.g., a long BSR). In another implementation, the joint BSR includes the first buffer size level and the second buffer size level in consecutive MAC PDUs. The transmission order may be indicated by an order of the first buffer size level and the second buffer size level. Accordingly, the UE 104, the TX processor 368, and/or the controller/processor 359 executing the joint transmission component 140 and/or the request component 142 may provide means for transmitting, from a UE, a joint scheduling request and a joint BSR for an uplink transmission on a Uu link with a base station and a sidelink transmission on a sidelink with another UE.

At block 620, the method 600 may include receiving, from the base station, a joint transmission grant scheduling the uplink transmission on a first set of resources and scheduling the sidelink transmission on a second set of resources. In an aspect, for example, the UE 104, the RX processor 356, and/or the controller/processor 359 may execute the joint transmission component 140 and/or the joint grant component 144 to receive, from the base station 102, a joint transmission grant 420 scheduling the uplink transmission 426 on a first set of resources 520 and scheduling the sidelink transmission 436 on a second set of resources 510. For example, the joint transmission grant 420 may be received as a DCI having a format including at least the first set of resources 520 for the uplink transmission 426 and the second set of resources 510 for the sidelink transmission 436. In another implementation, the joint transmission grant is received as two separate DCIs. Accordingly, the UE 104, the RX processor 356, and/or the controller/processor 359 executing the joint transmission component 140 and/or the joint grant component 144 may provide means for receiving, from the base station, a joint transmission grant scheduling the uplink transmission on a first set of resources and scheduling the sidelink transmission on a second set of resources.

At block 630, the method 600 may include transmitting, from the UE, a first transmission on the first set of resources for the uplink transmission and a second transmission on the second set of resources for the sidelink transmission. In an aspect, for example, the UE 104, the TX processor 368, and/or the controller/processor 359 may execute the joint transmission component 140 and/or the transmitting component 146 to transmit, from the UE 104*a*, a first transmission on the first set of resources 520 for the uplink transmission 426 and a second transmission on the second set of resources 510 for the sidelink transmission 436. The joint transmission grant may schedule a transmission gap between the uplink transmission and the sidelink transmission. The transmission gap may be configurable (e.g., have a variable length). For example, the transmission gap may be configured by RRC signaling, DCI signaling, or a combination thereof. In an implementation, the transmission gap is zero if a numerology of the Uu link is the same as a numerology of the sidelink and a difference in a timing advance for the Uu link and for the sidelink is less than a threshold. In an aspect, at sub-block 632, the block 630 may optionally include performing radio frequency tuning between a numerology for the uplink transmission and a numerology for the sidelink transmission during a transmission gap. For instance, the transmitting component 146 may perform radio frequency tuning between the numerology for the uplink transmission 426 and the numerology for the sidelink transmission 436 during the transmission gap 512. Accordingly, the UE 104, the TX processor 368, and/or the controller/processor 359 executing the joint transmission component 140 and/or the transmitting component 146 may provide means for transmitting, from the UE, a first transmission on the first set of resources for the uplink transmission and a second transmission on the second set of resources for the sidelink transmission.

At block 640, the method 600 may optionally include receiving, from the base station, a joint reception grant scheduling a downlink transmission from the base station on a third set of resources and a sidelink reception for the UE on a fourth set of resources. In an aspect, for example, the UE 104, the RX processor 356, and/or the controller/processor 359 may execute the joint transmission component 140 and/or the joint grant component 144 to receive, from the base station 102, a joint reception grant 422 scheduling a downlink transmission from the base station 102 on a third set of resources 550 and a sidelink reception for the UE on a fourth set of resources 530. The joint reception grant may be received as a DCI having a format including at least the third set of resources for the downlink transmission and the fourth set of resources for the sidelink reception. Alternatively, the joint reception grant may be received as two DCIs. The two DCIs may be separate DCIs within one slot or within different slots within a downlink relative latency requirement. The joint transmission grant and the joint reception grant may schedule a gap between the sidelink reception and the uplink transmission or the sidelink transmission. Accordingly, the UE 104, the RX processor 356, and/or the controller/processor 359 executing the joint transmission component 140 and/or the joint grant component 144 may provide means for receiving, from the base station, a joint reception grant scheduling a downlink transmission from the base station on a third set of resources and a sidelink reception for the UE on a fourth set of resources.

At block 650, the method 600 may optionally include receiving the downlink transmission from the base station on the third set of resources and the sidelink reception from the other UE on the fourth set of resources. In an aspect, for example, the UE 104, the RX processor 356, and/or the controller/processor 359 may execute the joint transmission component 140 and/or the receiving component 148 to receive the downlink transmission from the base station 102 on the third set of resources 550 and the sidelink reception from the other UE 104*b* on the fourth set of resources 530. Accordingly, the UE 104, the RX processor 356, and/or the controller/processor 359 executing the joint transmission component 140 and/or the receiving component 148 may provide means for receiving the downlink transmission from the base station on the third set of resources and the sidelink reception from the other UE on the fourth set of resources.

Figure 7:
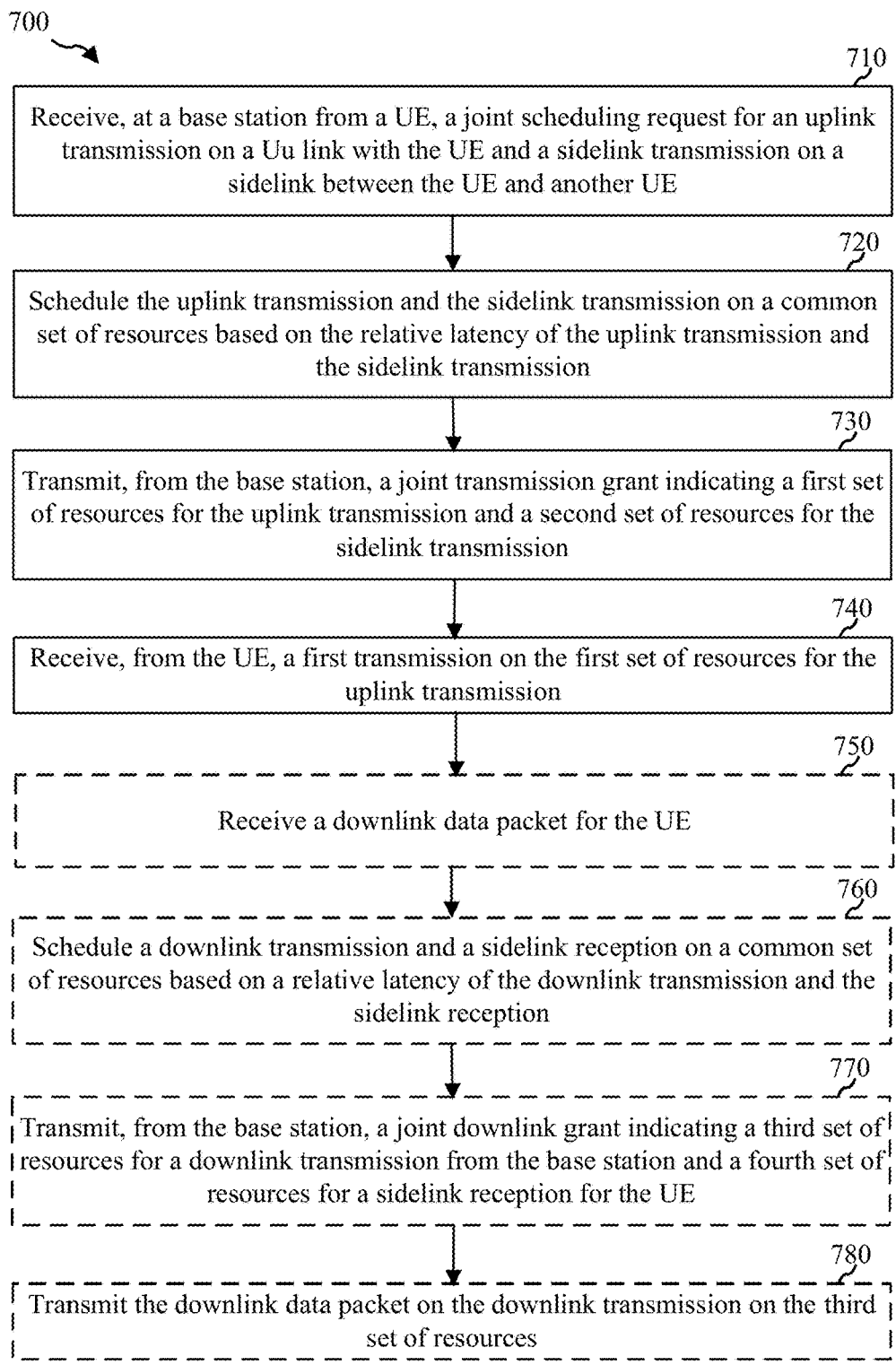
FIG. 7 is a flowchart of an example method of joint scheduling transmissions on the Uu link and the sidelink for a base station, in accordance with certain aspects of the present description.

FIG. 7 is a flowchart of a method 700 of wireless communication that may be performed by a base station (e.g., the base station 102, which may include the memory 376 and which may be the entire base station 102 or a component of the base station 102 such as the joint scheduling component 198, TX processor 316, the RX processor 370, and/or the controller/processor 375) for scheduling a joint transmission on a Uu link and a sidelink. The method 700 may be performed in communication with a UE 104 including the joint transmission component 140.

At block 710, the method 700 may include receiving, at a base station from a UE, a joint scheduling request and a joint BSR for an uplink transmission on a Uu link with the UE and a sidelink transmission on a sidelink between the UE and another UE. The joint BSR may be associated with a relative latency of the uplink transmission and the sidelink transmission. In an aspect, for example, the base station 102, the RX processor 370, and/or the controller/processor 375 may execute the joint scheduling component 198 and/or the request component 942 to receive, at the base station 102 from a UE 104, the joint scheduling request 410 and the joint BSR 412 for an uplink transmission 426 on a Uu link with the UE 104 and a sidelink transmission 436 on a sidelink between the UE 104a and another UE 104b. The joint scheduling request 410 may have a longer symbol duration or higher energy than a scheduling request for a single transmission. The joint BSR 412 may indicate a first buffer size level for a Uu uplink buffer and a second buffer size level for a sidelink buffer, the relative latency, and a transmission order of the uplink transmission 426 and the sidelink transmission 436. The joint BSR may include the first buffer size level and the second buffer size level in a single MAC CE. The joint BSR may include the first buffer size level and the second buffer size level in consecutive MAC PDUs. The transmission order may be indicated by an order of the first buffer size level and the second buffer size level. Accordingly, the base station 102, the RX processor 370, and/or the controller/processor 375 executing the joint scheduling component 198 and/or the request component 942 may provide means for receiving, at a base station from a UE, a joint scheduling request and a joint BSR for an uplink transmission on a Uu link with the UE and a sidelink transmission on a sidelink between the UE and another UE.

At block 720, the method 700 may include scheduling the uplink transmission and the sidelink transmission on a common set of resources based on the relative latency of the uplink transmission and the sidelink transmission. In an aspect, for example, the base station 102, and/or the controller/processor 375 may execute the joint scheduling component 198 and/or the resource component 944 to schedule the uplink transmission 426 and the sidelink transmission 436 on a common set of resources 502 based on the relative latency of the uplink transmission 426 and the sidelink transmission 436. Accordingly, the base station 102, and/or the controller/processor 375 executing the joint scheduling component 198 and/or the resource component 944 may provide means for scheduling the uplink transmission and the sidelink transmission on a common set of resources based on the relative latency of the uplink transmission and the sidelink transmission.

At block 730, the method 700 may include transmitting, from the base station, a joint transmission grant indicating a first set of resources for the uplink transmission and a second set of resources for the sidelink transmission. In an aspect, for example, the base station 102, TX processor 316, and/or the controller/processor 375 may execute the joint scheduling component 198 and/or the joint grant component 946 to transmit, from the base station 102, a joint transmission grant 420 indicating a first set of resources 520 for the uplink transmission 426 and a second set of resources 510 for the sidelink transmission 436. The joint transmission grant 420 may be transmitted as a DCI having a format including at least the first set of resources for the uplink transmission and the second set of resources for the sidelink transmission. In another implementation, the joint transmission grant 420 may be transmitted as two separate DCIs. The two DCIs may be separate DCIs within one slot or within different slots within a downlink relative latency requirement. The joint transmission grant may schedule a transmission gap between the uplink transmission and the sidelink transmission. The transmission gap may be configurable (e.g., have a variable length). For example, the transmission gap may be configured by RRC signaling, DCI signaling, or a combination thereof. In an implementation, the transmission gap is zero if a numerology of the Uu link is the same as a numerology of the sidelink and a difference in a timing advance for the Uu link and for the sidelink is less than a threshold. Accordingly, the base station 102, TX processor 316, and/or the controller/processor 375 executing the joint scheduling component 198 and/or the joint grant component 946 may provide means for transmitting, from the base station, a joint transmission grant indicating a first set of resources for the uplink transmission and a second set of resources for the sidelink transmission.

At block 740, the method 700 may include receiving, from the UE, a first transmission on the first set of resources for the uplink transmission. In an aspect, for example, the base station 102, the RX processor 370, and/or the controller/processor 375 may execute the joint scheduling component 198 and/or the receiving component 950 to receive, from the UE 104, a first transmission on the first set of resources 520 for the uplink transmission 426. Accordingly, the base station 102, the RX processor 370, and/or the controller/processor 375 executing the joint scheduling component 198 and/or the receiving component 950 may provide means for receiving, from the UE, a first transmission on the first set of resources for the uplink transmission.

At block 750, the method 700 may optionally include receiving a downlink data packet for the UE. In an aspect, for example, the base station 102, the RX processor 370, and/or the controller/processor 375 may execute the joint scheduling component 198 and/or the receiving component 950 to receive a downlink data packet for the UE 104. Accordingly, the base station 102, the RX processor 370, and/or the controller/processor 375 executing the joint scheduling component 198 and/or the receiving component 950 may provide means for receiving a downlink data packet for the UE.

At block 760, the method 700 may optionally include scheduling a downlink transmission and a sidelink reception on a common set of resources based on a relative latency of the downlink transmission and the sidelink reception. In an aspect, for example, the base station 102 and/or the controller/processor 375 may execute the joint scheduling component 198 and/or the resource component 944 to schedule a downlink transmission and a sidelink reception on a common set of resources 502 based on a relative latency of the downlink transmission and the sidelink reception. Accordingly, the base station 102 and/or the controller/processor 375 executing the joint scheduling component 198 and/or the resource component 944 may provide means for scheduling a downlink transmission and a sidelink reception on a common set of resources based on a relative latency of the downlink transmission and the sidelink reception.

At block 770, the method 700 may include transmitting, from the base station, a joint reception grant indicating a third set of resources for a downlink transmission from the base station and a fourth set of resources for a sidelink reception for the UE. In an aspect, for example, the base station 102, the TX processor 316, and/or the controller/processor 375 may execute the joint scheduling component 198 and/or the joint grant component 946 to transmit, from the base station 102, a joint reception grant 422 indicating a third set of resources for a downlink transmission 428 from the base station 102 and a fourth set of resources 530 for a sidelink reception for the UE 104. In an implementation, the joint reception grant is transmitted as a DCI having a format including at least the third set of resources for the downlink transmission and the fourth set of resources for the sidelink reception. In another implementation, the joint reception grant is transmitted as two DCIs. The joint transmission grant and the joint reception grant may schedule a gap between the sidelink reception and the uplink transmission or the sidelink transmission. Accordingly, the base station 102, the TX processor 316, and/or the controller/processor 375 executing the joint scheduling component 198 and/or the joint grant component 946 may provide means for transmitting, from the base station, a joint reception grant indicating a third set of resources for a downlink transmission from the base station and a fourth set of resources for a sidelink reception for the UE.

At block 780, the method 700 may optionally include transmitting the downlink data packet on the downlink transmission on the third set of resources. In an aspect, for example, the base station 102, the TX processor 316, and/or the controller/processor 375 may execute the joint scheduling component 198 and/or the transmitting component 948 to transmit the downlink data packet on the downlink transmission 428 on the third set of resources. Accordingly, the base station 102, the TX processor 316, and/or the controller/processor 375 executing the joint scheduling component 198 and/or the transmitting component 948 may provide means for transmitting the downlink data packet on the downlink transmission on the third set of resources.

Figure 8:
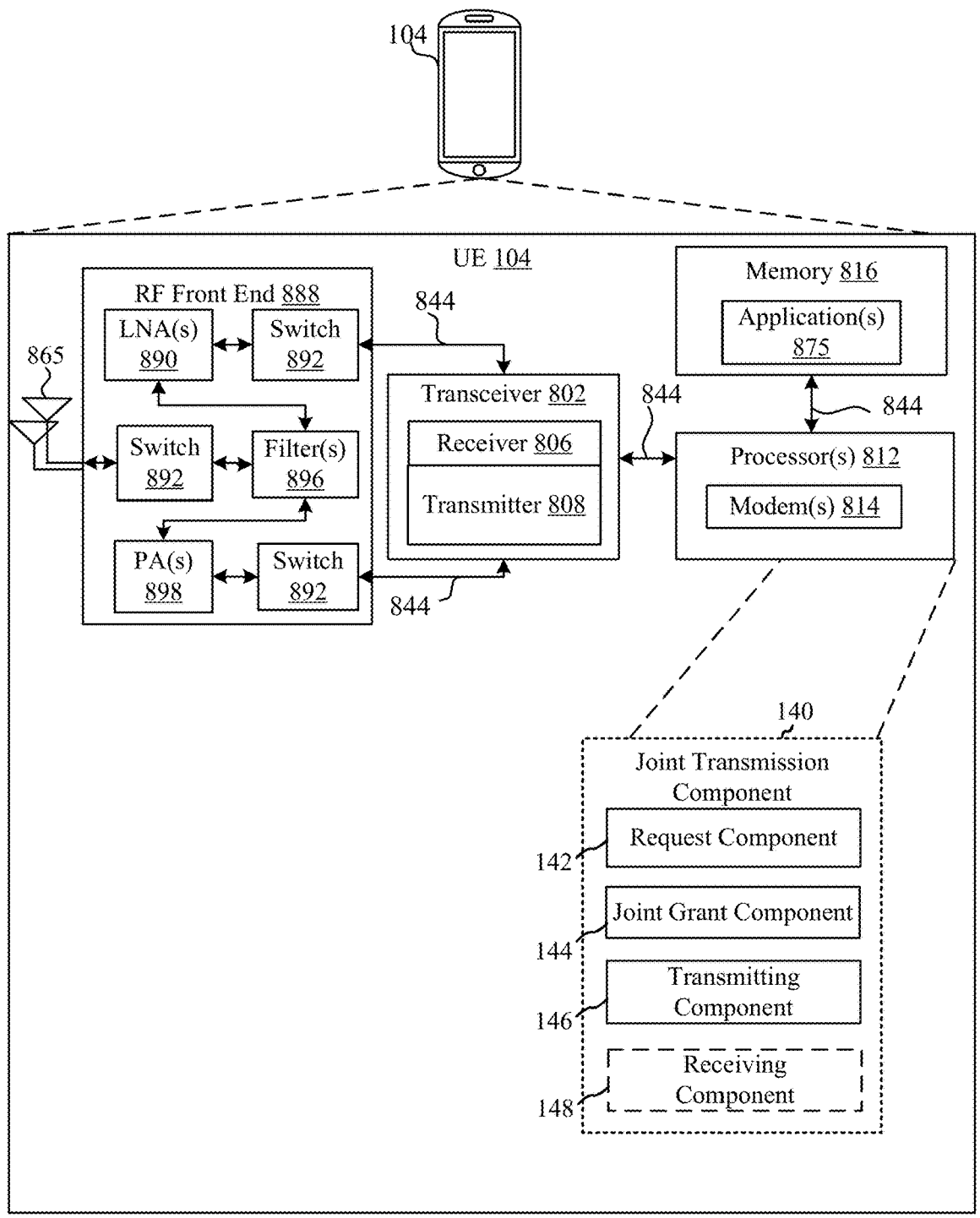
FIG. 8 is a schematic diagram of example components of the UE of FIG. 1, in accordance with certain aspects of the present description.

Referring to FIG. 8, one example of an implementation of UE 104 (e.g., UE 104a, UE 104b, or UE 104c) may include a variety of components, some of which have already been described above, but including components such as one or more processors 812 and memory 816 and transceiver 802 in communication via one or more buses 844, which may operate in conjunction with modem 814, and joint transmission component 140 to enable one or more of the functions described herein related to joint transmissions. Further, the one or more processors 812, modem 814, memory 816, transceiver 802, RF front end 888 and one or more antennas 865 may be configured to support voice and/or data calls (simultaneously or non-simultaneously) in one or more radio access technologies. The antennas 865 may include one or more antennas, antenna elements, and/or antenna arrays.

In an aspect, the one or more processors 812 may include a modem 814 that uses one or more modem processors. The various functions related to joint transmission component 140 may be included in modem 814 and/or processors 812 and, in an aspect, may be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 814 associated with joint transmission component 140 may be performed by transceiver 802.

Also, memory 816 may be configured to store data used herein and/or local versions of applications 875, Sidelink CG component 140 and/or one or more of subcomponents thereof being executed by at least one processor 812. Memory 816 may include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining joint transmission component 140 and/or one or more of subcomponents thereof, and/or data associated therewith, when UE 104 is operating at least one processor 812 to execute joint transmission component 140 and/or one or more subcomponents thereof.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, SNR, RSRP, RSSI, etc. Transmitter 808 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and may include one or more low-noise amplifiers (LNAs) 890, one or more switches 892, one or more power amplifiers (PAs) 898, and one or more filters 896 for transmitting and receiving RF signals.

In an aspect, LNA 890 may amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 may be used by RF front end 888 to filter a received signal to obtain an input RF signal. Similarly, in an aspect, for example, a respective filter 896 may be used to filter an output from a respective PA 898 to produce an output signal for transmission. In an aspect, each filter 896 may be connected to a specific LNA 890 and/or PA 898. In an aspect, RF front end 888 may use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver 802 may be tuned to operate at specified frequencies such that UE 104 can communicate with, for example, one or more base stations 102 or one or more cells associated with one or more base stations 102. In an aspect, for example, modem 814 may configure transceiver 802 to operate at a specified frequency and power level based on the UE configuration of the UE 104 and the communication protocol used by modem 814.

In an aspect, modem 814 may be a multiband-multimode modem, which can process digital data and communicate with transceiver 802 such that the digital data is sent and received using transceiver 802. In an aspect, modem 814 may be multiband and be configured to support multiple frequency bands for a specific communications protocol. In an aspect, modem 814 may be multimode and be configured to support multiple operating networks and communications protocols. In an aspect, modem 814 may control one or more components of UE 104 (e.g., RF front end 888, transceiver 802) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Referring to FIG. 9, one example of an implementation of base station 102 may include a variety of components, some of which have already been described above, but including components such as one or more processors 912 and memory 916 and transceiver 902 in communication via one or more buses 954, which may operate in conjunction with modem 914 and joint scheduling component 198 to enable one or more of the functions described herein related to joint transmissions.

The transceiver 902, receiver 906, transmitter 908, one or more processors 912, memory 916, applications 975, buses 954, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

SOME FURTHER EXAMPLE IMPLEMENTATIONS

A first example method of wireless communication, comprising: transmitting, from UE, a joint scheduling request and a joint BSR for an uplink transmission on a Uu link with a base station and a sidelink transmission on a sidelink with another UE, wherein the joint BSR is associated with a relative latency of the uplink transmission and the sidelink transmission; receiving, from the base station, a joint transmission grant scheduling the uplink transmission on a first set of resources and scheduling the sidelink transmission on a second set of resources; and transmitting, from the UE, a first transmission on the first set of resources for the uplink transmission and a second transmission on the second set of resources for the sidelink transmission.

The above first example method, further comprising: receiving, from the base station, a joint reception grant scheduling a downlink transmission from the base station on a third set of resources and a sidelink reception for the UE on a fourth set of resources; and receiving the downlink transmission from the base station on the third set of resources and the sidelink reception from the other UE on the fourth set of resources.

Any of the above first example methods, wherein the joint scheduling request has a longer symbol duration or higher energy than a scheduling request for a single transmission.

Any of the above first example methods, wherein the joint BSR indicates a first buffer size level for a Uu uplink buffer and a second buffer size level for a sidelink buffer, the relative latency, and a transmission order of the uplink transmission and the sidelink transmission.

Any of the above first example methods, wherein the joint BSR includes the first buffer size level and the second buffer size level in a single MAC CE.

Any of the above first example methods, wherein the joint BSR includes the first buffer size level and the second buffer size level in consecutive MAC PDUs.

Any of the above first example methods, wherein the transmission order is indicated by an order of the first buffer size level and the second buffer size level.

Any of the above first example methods, wherein the joint transmission grant is received as a DCI having a format including at least the first set of resources for the uplink transmission and the second set of resources for the sidelink transmission.

Any of the above first example methods, wherein the joint transmission grant is received as two separate DCIs.

Any of the above first example methods, wherein the joint reception grant is received as a DCI having a format including at least the third set of resources for the downlink transmission and the fourth set of resources for the sidelink reception.

Any of the above first example methods, wherein the joint reception grant is received as two DCIs.

Any of the above first example methods, wherein the two DCIs are separate DCIs within one slot or within different slots within a downlink relative latency requirement.

Any of the above first example methods, wherein the joint transmission grant schedules a transmission gap between the uplink transmission and the sidelink transmission.

Any of the above first example methods, wherein the transmission gap is configurable by radio resource control (RRC) signaling and DCI signaling, or a combination thereof.

Any of the above first example methods, wherein the transmission gap is zero if a numerology of the Uu link is the same as a numerology of the sidelink and a difference in a timing advance for the Uu link and for the sidelink is less than a threshold.

Any of the above first example methods, further comprising performing radio frequency tuning between a numerology for the uplink transmission and a numerology for the sidelink transmission during the transmission gap.

Any of the above first example methods, wherein the joint transmission grant and the joint reception grant schedule a gap between the sidelink reception and the uplink transmission or the sidelink transmission.

A second example method of wireless communication, comprising: receiving, at a base station from a UE, a joint scheduling request and a joint BSR for an uplink transmission on a Uu link with the UE and a sidelink transmission on a sidelink between the UE and another UE, wherein the joint scheduling request is associated with a relative latency of the uplink transmission and the sidelink transmission; scheduling the uplink transmission and the sidelink transmission on a common set of resources based on the relative latency of the uplink transmission and the sidelink transmission; transmitting, from the base station, a joint transmission grant indicating a first set of resources for the uplink transmission and a second set of resources for the sidelink transmission; and receiving, from the UE, a first transmission on the first set of resources for the uplink transmission.

The above second example method, further comprising: receiving a downlink data packet for the UE; scheduling a downlink transmission and a sidelink reception on a common set of resources based on a relative latency of the downlink transmission and the sidelink reception; transmitting, from the base station, a joint reception grant indicating a third set of resources for a downlink transmission from the base station and a fourth set of resources for a sidelink reception for the UE; and transmitting the downlink data packet on the downlink transmission on the third set of resources.

Any of the above second example methods, wherein the joint scheduling request has a longer symbol duration or higher energy than a scheduling request for a single transmission.

Any of the above second example methods, wherein the joint BSR indicates a first buffer size level for a Uu uplink buffer and a second buffer size level for a sidelink buffer, the relative latency, and a transmission order of the uplink transmission and the sidelink transmission.

Any of the above second example methods, wherein the joint BSR includes the first buffer size level and the second buffer size level in a single MAC CE.

Any of the above second example methods, wherein the joint BSR includes the first buffer size level and the second buffer size level in consecutive MAC PDUs.

Any of the above second example methods, wherein the transmission order is indicated by an order of the first buffer size level and the second buffer size level.

Any of the above second example methods, wherein the joint transmission grant is transmitted as a DCI having a format including at least the first set of resources for the uplink transmission and the second set of resources for the sidelink transmission.

Any of the above second example methods, wherein the joint transmission grant is transmitted as two separate DCIs.

Any of the above second example methods, wherein the joint reception grant is transmitted as a DCI having a format including at least the third set of resources for the downlink transmission and the fourth set of resources for the sidelink reception.

Any of the above second example methods, wherein the joint reception grant is transmitted as two DCIs.

Any of the above second example methods, wherein the two DCIs are separate DCIs within one slot or within different slots within a downlink relative latency requirement.

Any of the above second example methods, wherein the joint transmission grant schedules a transmission gap between the uplink transmission and the sidelink transmission.

Any of the above second example methods, wherein the transmission gap is configurable by radio resource control (RRC) signaling and DCI signaling, or a combination thereof.

Any of the above second example methods, wherein the transmission gap is zero if a numerology of the Uu link is the same as a numerology of the sidelink and a difference in a timing advance for the Uu link and for the sidelink is less than a threshold.

Any of the above second example methods, wherein the joint transmission grant and the joint reception grant schedule a gap between the sidelink reception and the uplink transmission or the sidelink transmission.

A first example apparatus for wireless communication, comprising: a memory; and at least one processor coupled to the memory and configured perform the method of any of the above first example methods.

A second example apparatus for wireless communication, comprising: a memory; and at least one processor coupled to the memory and configured perform any of the above second example methods.

A third example apparatus for wireless communication, comprising means for performing any of the above first example methods.

A fourth example apparatus for wireless communication, comprising means for performing any of the above second example methods.

A first example non-transitory computer-readable medium storing computer executable code, the code when executed by a processor causes the processor to perform any of the above first example methods.

A second example non-transitory computer-readable medium storing computer executable code, the code when executed by a processor causes the processor to perform any of the above second example methods.

What is claimed is:

1. A method of wireless communication, comprising at a user equipment (UE):
transmitting a joint scheduling request and a joint buffer status report (BSR) for an uplink transmission on a Uu link with a base station and a sidelink transmission on a sidelink with another UE, wherein the joint BSR is associated with a relative latency of the uplink transmission and the sidelink transmission;
receiving, from the base station, a joint transmission grant scheduling the uplink transmission on a first set of resources and scheduling the sidelink transmission on a second set of resources; and
transmitting a first transmission on the first set of resources for the uplink transmission and a second transmission on the second set of resources for the sidelink transmission;
wherein the joint transmission grant schedules a transmission gap between the uplink transmission and the sidelink transmission.

2. The method of claim 1, further comprising:
receiving, from the base station, a joint reception grant scheduling a downlink transmission from the base station on a third set of resources and a sidelink reception for the UE on a fourth set of resources; and
receiving the downlink transmission from the base station on the third set of resources and the sidelink reception from the other UE on the fourth set of resources.

3. A method of wireless communication, comprising at a user equipment (UE):
transmitting a joint scheduling request and a joint buffer status report (BSR) for an uplink transmission on a Uu link with a base station and a sidelink transmission on a sidelink with another UE, wherein the joint BSR is associated with a relative latency of the uplink transmission and the sidelink transmission;
receiving, from the base station, a joint transmission grant scheduling the uplink transmission on a first set of resources and scheduling the sidelink transmission on a second set of resources;
transmitting a first transmission on the first set of resources for the uplink transmission and a second transmission on the second set of resources for the sidelink transmission;
receiving, from the base station, a joint reception grant scheduling a downlink transmission from the base station on a third set of resources and a sidelink reception for the UE on a fourth set of resources; and
receiving the downlink transmission from the base station on the third set of resources and the sidelink reception from the other UE on the fourth set of resources;
wherein;
the joint transmission grant and the joint reception grant schedule a gap between the sidelink reception and the uplink transmission or the sidelink transmission; or
the joint reception grant is received as two downlink control informations (DCIs).

4. The method of claim 2, wherein the joint reception grant is received as a downlink control information (DCI) having a format including at least the third set of resources for the downlink transmission and the fourth set of resources for the sidelink reception.

5. The method of claim 3, wherein the two DCIs are separate DCIs within one slot or within different slots within a downlink relative latency requirement.

6. The method of claim 1, wherein the joint scheduling request has a longer symbol duration or higher energy than a scheduling request for a single transmission.

7. The method of claim 1, wherein the joint BSR indicates a first buffer size level for a Uu uplink buffer and a second buffer size level for a sidelink buffer, the relative latency, and a transmission order of the uplink transmission and the sidelink transmission.

8. The method of claim 7, wherein the joint BSR includes the first buffer size level and the second buffer size level in a single media access control (MAC) control element (CE).

9. A method of wireless communication, comprising at a user equipment (UE):
transmitting a joint scheduling request and a joint buffer status report (BSR) for an uplink transmission on a Uu link with a base station and a sidelink transmission on a sidelink with another UE, wherein the joint BSR is associated with a relative latency of the uplink transmission and the sidelink transmission;
receiving, from the base station, a joint transmission grant scheduling the uplink transmission on a first set of resources and scheduling the sidelink transmission on a second set of resources;
transmitting a first transmission on the first set of resources for the uplink transmission and a second transmission on the second set of resources for the sidelink transmission;
wherein the joint BSR indicates a first buffer size level for a Uu uplink buffer and a second buffer size level for a sidelink buffer, the relative latency, and a transmission order of the uplink transmission and the sidelink transmission; and
wherein;
the joint BSR includes the first buffer size level and the second buffer size level in consecutive MAC PDUs; or
the transmission order is indicated by an order of the first buffer size level and the second buffer size level.

10. The method of claim 1, wherein the joint transmission grant is received as a downlink control information (DCI) having a format including at least the first set of resources for the uplink transmission and the second set of resources for the sidelink transmission.

11. The method of claim 1, wherein the joint transmission grant is received as two separate DCIs.

12. The method of claim 1, wherein the joint transmission grant schedules a transmission gap between the uplink transmission and the sidelink transmission.

13. The method of claim 1, wherein the transmission gap is configurable by radio resource control (RRC) signaling, DCI signaling, or a combination thereof.

14. The method of claim 13, wherein the transmission gap is zero if a numerology of the Uu link is the same as a numerology of the sidelink and a difference in a timing advance for the Uu link and for the sidelink is less than a threshold.

15. The method of claim 1, further comprising performing radio frequency tuning between a numerology for the uplink transmission and a numerology for the sidelink transmission during the transmission gap.

16. A method of wireless communication, comprising, at a base station:
receiving, from a user equipment (UE), a joint scheduling request and a joint buffer status report (BSR) for an uplink transmission on a Uu link with the UE and a sidelink transmission on a sidelink between the UE and another UE, wherein the joint scheduling request is associated with a relative latency of the uplink transmission and the sidelink transmission;
scheduling the uplink transmission and the sidelink transmission on a common set of resources based on the relative latency of the uplink transmission and the sidelink transmission;
transmitting a joint transmission grant indicating a first set of resources for the uplink transmission and a second set of resources for the sidelink transmission; and
receiving, from the UE, a first transmission on the first set of resources for the uplink transmission;
wherein the joint transmission grant schedules a transmission gap between the uplink transmission and the sidelink transmission.

17. The method of claim 16, further comprising:
receiving a downlink data packet for the UE;
scheduling a downlink transmission and a sidelink reception on a common set of resources based on a relative latency of the downlink transmission and the sidelink reception;
transmitting, from the base station, a joint reception grant indicating a third set of resources for a downlink transmission from the base station and a fourth set of resources for a sidelink reception for the UE; and
transmitting the downlink data packet on the downlink transmission on the third set of resources.

18. The method of claim 16, wherein the joint scheduling request has a longer symbol duration or higher energy than a scheduling request for a single transmission.

19. The method of claim 16, wherein the joint BSR indicates a first buffer size level for a Uu uplink buffer and a second buffer size level for a sidelink buffer, the relative latency, and a transmission order of the uplink transmission and the sidelink transmission.

20. A method of wireless communication, comprising, at a base station:
receiving, from a user equipment (UE), a joint scheduling request and a joint buffer status report (BSR) for an uplink transmission on a Uu link with the UE and a sidelink transmission on a sidelink between the UE and another UE, wherein the joint scheduling request is associated with a relative latency of the uplink transmission and the sidelink transmission;
scheduling the uplink transmission and the sidelink transmission on a common set of resources based on the relative latency of the uplink transmission and the sidelink transmission;
transmitting a joint transmission grant indicating a first set of resources for the uplink transmission and a second set of resources for the sidelink transmission;
receiving, from the UE, a first transmission on the first set of resources for the uplink transmission;
wherein the joint BSR indicates a first buffer size level for a Uu uplink buffer and a second buffer size level for a sidelink buffer, the relative latency, and a transmission order of the uplink transmission and the sidelink transmission;
wherein the joint BSR includes the first buffer size level and the second buffer size level in a single media access control (MAC) control element (CE); and
wherein:
the joint BSR includes the first buffer size level and the second buffer size level in consecutive MAC PDUs; or
the transmission order is indicated by an order of the first buffer size level and the second buffer size level.

21. The method of claim 16, wherein the joint transmission grant is transmitted as a downlink control information (DCI) having a format including at least the first set of resources for the uplink transmission and the second set of resources for the sidelink transmission.

22. The method of claim 16, wherein the joint transmission grant is transmitted as two separate DCIs.

23. The method of claim 16, wherein the joint transmission grant schedules a transmission gap between the uplink transmission and the sidelink transmission.

24. A method of wireless communication, comprising, at a base station:
receiving, from a user equipment (UE), a joint scheduling request and a joint buffer status report (BSR) for an uplink transmission on a Uu link with the UE and a sidelink transmission on a sidelink between the UE and another UE, wherein the joint scheduling request is associated with a relative latency of the uplink transmission and the sidelink transmission;
scheduling the uplink transmission and the sidelink transmission on a common set of resources based on the relative latency of the uplink transmission and the sidelink transmission;
transmitting a joint transmission grant indicating a first set of resources for the uplink transmission and a second set of resources for the sidelink transmission;
receiving, from the UE, a first transmission on the first set of resources for the uplink transmission;
receiving a downlink data packet for the UE;
scheduling a downlink transmission and a sidelink reception on a common set of resources based on a relative latency of the downlink transmission and the sidelink reception;
transmitting, from the base station, a joint reception grant indicating a third set of resources for a downlink transmission from the base station and a fourth set of resources for a sidelink reception for the UE; and
transmitting the downlink data packet on the downlink transmission on the third set of resources;
wherein the joint transmission grant and the joint reception grant schedule a gap between the sidelink reception and the uplink transmission or the sidelink transmission.

25. An apparatus for wireless communication, comprising:
a memory storing computer-executable instructions; and
at least one processor coupled to the memory and configured to execute the instructions to:
transmit, from a user equipment (UE), a joint scheduling request and a joint buffer status report (BSR) for an uplink transmission on a Uu link with a base station and a sidelink transmission on a sidelink with another UE, wherein the joint BSR is associated with a relative latency of the uplink transmission and the sidelink transmission;
receive, from the base station, a joint transmission grant scheduling the uplink transmission on a first set of resources and scheduling the sidelink transmission on a second set of resources; and
transmit, from the UE, a first transmission on the first set of resources for the uplink transmission and a second transmission on the second set of resources for the sidelink transmission;
wherein the joint transmission grant schedules a transmission gap between the uplink transmission and the sidelink transmission.

26. An apparatus for wireless communication, comprising:
- a memory; and
- at least one processor coupled to the memory and configured to:
  - receive, from a user equipment (UE), a joint scheduling request and a joint buffer status report (BSR) for an uplink transmission on a Uu link with the UE and a sidelink transmission on a sidelink between the UE and another UE, wherein the joint scheduling request is associated with a relative latency of the uplink transmission and the sidelink transmission;
  - schedule the uplink transmission and the sidelink transmission on a common set of resources based on the relative latency of the uplink transmission and the sidelink transmission;
  - transmit a joint transmission grant indicating a first set of resources for the uplink transmission and a second set of resources for the sidelink transmission; and
  - receive, from the UE, a first transmission on the first set of resources for the uplink transmission;
  - wherein the joint transmission grant schedules a transmission gap between the uplink transmission and the sidelink transmission.

* * * * *